(12) United States Patent
Munson

(10) Patent No.: US 10,440,129 B2
(45) Date of Patent: *Oct. 8, 2019

(54) UNIFIED LOCATION AND PRESENCE COMMUNICATION ACROSS REAL AND VIRTUAL WORLDS

(71) Applicant: AT&T INTELLECTUAL PROPERTY I, L.P., Atlanta, GA (US)

(72) Inventor: Gary Munson, Little Silver, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/453,286

(22) Filed: Mar. 8, 2017

(65) Prior Publication Data

US 2017/0180492 A1 Jun. 22, 2017

Related U.S. Application Data

(63) Continuation of application No. 15/184,231, filed on Jun. 16, 2016, now Pat. No. 9,628,584, which is a continuation of application No. 14/158,026, filed on Jan. 17, 2014, now Pat. No. 9,398,115, which is a
(Continued)

(51) Int. Cl.
| | |
|---|---|
| *H04L 29/08* | (2006.01) |
| *A63F 13/87* | (2014.01) |
| *A63F 13/35* | (2014.01) |
| *A63F 13/79* | (2014.01) |
| *A63F 13/40* | (2014.01) |
| *A63F 13/30* | (2014.01) |
| *G06F 3/0481* | (2013.01) |

(Continued)

(52) U.S. Cl.
CPC .............. *H04L 67/18* (2013.01); *A63F 13/10* (2013.01); *A63F 13/12* (2013.01); *A63F 13/35* (2014.09); *A63F 13/79* (2014.09); *A63F 13/87* (2014.09); *G06F 3/04815* (2013.01); *H04L 51/04* (2013.01); *H04L 65/1083* (2013.01); *H04L 67/38* (2013.01); *A63F 2300/205* (2013.01); *A63F 2300/5533* (2013.01); *A63F 2300/5553* (2013.01); *A63F 2300/572* (2013.01); *A63F 2300/8082* (2013.01)

(58) Field of Classification Search
None
See application file for complete search history.

(56) References Cited

U.S. PATENT DOCUMENTS

| | | |
|---|---|---|
| 6,961,755 B2 | 11/2005 | Matsuda |
| 7,007,065 B2 | 2/2006 | Matsuda |
| 7,139,984 B2 | 11/2006 | Beaumont et al. |

(Continued)

*Primary Examiner* — Brian Whipple
(74) *Attorney, Agent, or Firm* — Guntin & Gust, PLC; Matthew Tropper

(57) ABSTRACT

A method and system for providing unified location and presence information of and intercommunication among a plurality of networked users is disclosed, where the users may be real world people or virtual world personae. Generally, after receiving data representative of a first and second user's presence or location in the real or a virtual world over a communications network, the users are permitted to view each other's presence in a virtual network. The users are identified by endpoint addresses, and may intercommunicate using various types of media via the communications network.

20 Claims, 2 Drawing Sheets

Related U.S. Application Data continuation of application No. 12/637,725, filed on Dec. 14, 2009, now Pat. No. 8,655,964.

(51) Int. Cl.
*H04L 29/06* (2006.01)
*H04L 12/58* (2006.01)

(56) References Cited

U.S. PATENT DOCUMENTS

| | | |
|---|---|---|
| 7,373,377 B2 | 5/2008 | Altieri |
| 8,026,918 B1 | 9/2011 | Murphy |
| 8,393,967 B2 | 3/2013 | Farrier et al. |
| 8,547,381 B2 | 10/2013 | Murphy |
| 2002/0002586 A1 | 1/2002 | Rafal et al. |
| 2003/0014437 A1 | 1/2003 | Beaumont et al. |
| 2004/0249891 A1 | 12/2004 | Khartabil et al. |
| 2005/0192999 A1* | 9/2005 | Cook ............... G06F 17/30241 |
| 2007/0067398 A1 | 3/2007 | Karmarkar |
| 2007/0250577 A1 | 10/2007 | Veeramachaneni et al. |
| 2008/0204450 A1* | 8/2008 | Dawson ............... G06Q 30/02 345/419 |
| 2008/0209011 A1 | 8/2008 | Stremel et al. |
| 2008/0255957 A1 | 10/2008 | Erdem |
| 2009/0113053 A1 | 4/2009 | Van Wie et al. |
| 2009/0113066 A1 | 4/2009 | Van Wie et al. |
| 2009/0118017 A1* | 5/2009 | Perlman ............. H04N 21/2143 463/42 |
| 2009/0254843 A1 | 10/2009 | Van Wie et al. |
| 2009/0276250 A1 | 11/2009 | King et al. |
| 2009/0287783 A1 | 11/2009 | Beare et al. |
| 2009/0300525 A1* | 12/2009 | Jolliff ................ H04M 1/72544 715/764 |
| 2010/0167809 A1* | 7/2010 | Perlman .................. A63F 13/12 463/24 |
| 2010/0180214 A1 | 7/2010 | Bates et al. |
| 2010/0269053 A1 | 10/2010 | Lingafelt et al. |
| 2010/0275136 A1 | 10/2010 | Gower |
| 2010/0321378 A1 | 12/2010 | Betzler et al. |
| 2012/0079046 A1 | 3/2012 | Murphy |
| 2014/0362165 A1* | 12/2014 | Ackerman .......... H04L 65/4076 348/14.07 |
| 2016/0294982 A1 | 10/2016 | Munson |

* cited by examiner

UNIFIED LOCATION AND PRESENCE COMMUNICATION ACROSS REAL AND VIRTUAL WORLDS

CROSS-REFERENCE TO RELATED APPLICATIONS

This application is a continuation of and claims priority to U.S. patent application Ser. No. 15/184,231, filed Jun. 16, 2016, which is a continuation of and claims priority to U.S. patent application Ser. No. 14/158,026, filed Jan. 17, 2014 (now U.S. Pat. No. 9,398,115), which is a continuation of and claims priority to U.S. patent application Ser. No. 12/637,725 filed Dec. 14, 2009 (now U.S. Pat. No. 8,655,964), each of which is incorporated by reference herein in its entirety.

FIELD OF THE DISCLOSURE

The present disclosure relates generally to communication networks, and more particularly, to a method and devices for providing a unified location, presence and intercommunication experience among a plurality of networked users that may be real-world or within virtual worlds.

BACKGROUND OF THE DISCLOSURE

Telecommunications and information-sharing (e.g., presence and location) concepts, services and underlying technology in the real world are well known. There are also virtual worlds in which people participate as virtual entities, along with methods of communication between virtual entities within a given virtual world for sharing information. Increasingly, individuals participate in virtual world systems as well as the real world. Intercommunication and information sharing across the real and virtual worlds can be useful. For example, a real-world x-ray could be delivered to a doctor's virtual entity practicing a medical procedure in a surgery simulation virtual world; or a mother could text her son's avatar that it's time to come home for dinner while he is role-playing in a virtual world over at a friend's house; or a granddaughter's virtual entity could video-share with her grandmother her latest living room layout in a home decorating virtual world; or a virtual entity active in one virtual world could be conferenced in with virtual entities from other virtual worlds to discuss or demonstrate martial arts techniques; or real world person Terry could share with his friends that he is currently role-playing as Avatar X in a specific virtual world and is in Chamber 3 of Level 9 so that they might join him there with their avatars.

It would therefore be advantageous to provide a system and methodology that provides a services environment that comprehensively addresses presence, location and media (voice, video, texting, etc.) across real and virtual worlds, and that can be known in either communication between personae in real and virtual worlds or between personae in virtual worlds.

SUMMARY

In accordance with an aspect of the present disclosure, a method for providing at least one of presence and location information and media communication over a communications network between plural networked users is disclosed. The method comprises receiving data representative of at least one of a first user's presence and location over the communications network and data representative of at least one of a second user's presence and location over the communications network. An environment is generated for the first user and the second user to merge the at least one of the first user and second user's presence and location in a virtual world, the environment enabling the users to view each other's presence and location data over the communications network as either virtual personas with respect to each other or as virtual/real personas with respect to each other, and the environment enabling such users to communicate with each other through various media.

In accordance with another aspect of the present disclosure, there is provided at least one server coupled to a communications network, comprising at least one module and at least one processor for executing machine executable instructions encoded in a memory medium which, when executed by the at least one processor enable a sharing of at least one of virtual presence and location information between a plurality of networked users over the communications network. The server(s) are operable to receive data representative of at least one of a first user's presence and location over the communications network and data representative of at least one of a second user's presence and location over the communications network. An environment is generated for the first user and the second user to merge the at least one of the first user and second user's presence and location in a virtual world. The environment enables the users to view each other's presence and location data over the communications network as either virtual personas with respect to each other, or as virtual/real personas with respect to each other. The server(s) are further adapted for rendering a media presentation for the first user to communicate with the second user over the communications network, the presentation adapted for a respective media channel on which each user communicates over the network.

These aspects of the disclosure and further advantages thereof will become apparent to those skilled in the art as the present disclosure is described with particular reference to the accompanying drawings.

DETAILED DESCRIPTION OF THE DRAWINGS

Embodiments of the disclosure will be described with reference to the accompanying drawing figures wherein like numbers represent like elements throughout. Before embodiments of the disclosure are explained in detail, it is to be understood that the disclosure is not limited in its application to the details of the examples set forth in the following description or illustrated in the figures. The disclosure is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
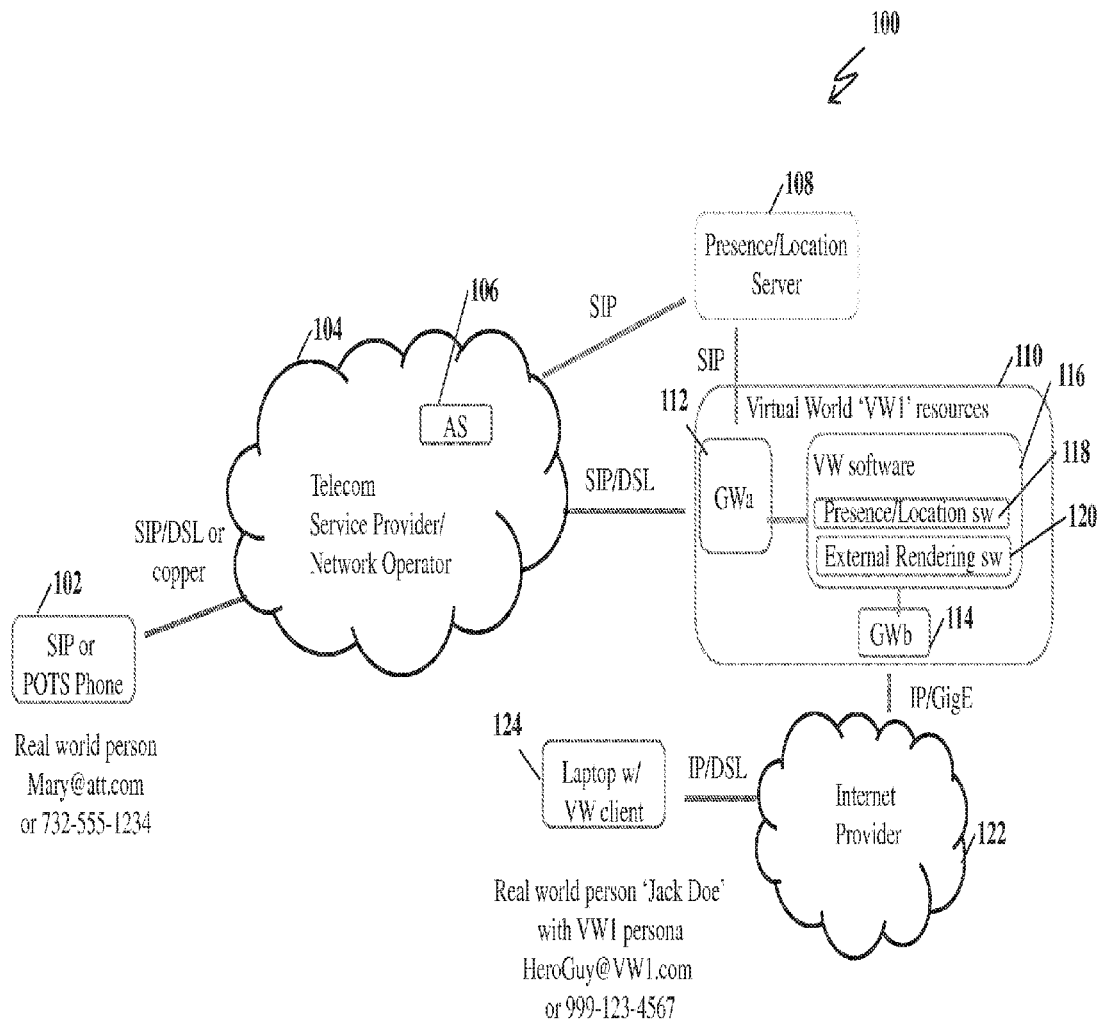
FIG. 1 is a high level schematic diagram of a first embodiment of a system of the present disclosure.

FIG. 1 is a high level schematic of a first illustrative embodiment of a network 100 for implementing aspects of the present disclosure. Reference numeral 102 represents a first network access device (NAD), such as a traditional land-line telephone, i.e., Plain Old Telephone Service (POTS), or a mobile telephone or Personal Digital Assistant (PDA), i.e., Palm™, Blackberry™, or the like. These devices may utilize a Session Initiation Protocol (SIP) or other multimedia (MMS) signaling protocol commonly utilized for controlling multimedia communications sessions. A circuit or packet switched network 104—such as a Telecom Service Provider/Network Operator network—includes an Application Server (AS) 106 and connects NAD 102 via SIP over a Broadband Internet Protocol (IP) connection, such as Digital Subscriber Line (DSL), Cable, Fiber Optic, copper, Wi-Fi or WiMAX or any other method hereinbefore utilized or that may be developed hereinafter for network access.

A Presence/Location (P/L) server 108 is configured with appropriate hardware, firmware and/or software to provide an "environment" where virtual and real worlds are comingled for networked users. In this regard server 108 is adapted to receive and process information from virtual and real-world software applications and end-points. Switching/access network 104 communicates with the P/L server 108 via the SIP or other protocol. Reference numeral 110 represents Virtual World (VW1) resources, which in an illustrative embodiment comprises a Gateway (GWa) 112, Gateway (GWb) 114 and Virtual World (VW) Application 116. VW application 116 may be further comprised of Presence and Location Software (P/LS) 118 and External Rendering Software (ERS) 120. This application is advantageously adapted to confer functionality that (a) provides a networked user's presence/location to P/L server 108 corresponding to virtual participant(s), (b) supports communications with real networks and virtual world software program(s) and (c) supports communications with an internal virtual "persona" as an endpoint. Additionally, VW application 116 can be configured to facilitate session establishment (e.g., voice calls), addressing, and routing to real networks and virtual world software connecting real and virtual personae; including virtual-to-virtual connections. VW1 resources 110 couples to network 104, P/L server 108 and a Wide Area Network (WAN) 122 via SIP/DSL, SIP and Internet Protocol/Gigabit Ethernet (IP/GigE), respectively. WAN 122 enables a plurality of NADs to connect to the system, such as a laptop computer characterized by reference numeral 124.

The following is an implementation of the above-described exemplary embodiment. An avatar representation (e.g., "HeroGuy") in virtual world 1 (VW1), for example Second Life, would like to advertise his presence and location information in the virtual world as "HeroGuy", along with presence and location information in the real world as himself "Jack Doe". Others, in real or virtual worlds, would be able to learn of the presence and location and even communicate with "HeroGuy" in VW1, or even join "HeroGuy" at his location in VW1.

More specifically and continuing with particular reference to FIG. 1, a "real world" network user—e.g., Jack Doe—has logged into VW1 via laptop 124 as HeroGuy@VW1.com and utilizes VW1 resources 110. VW software 116, in accordance with the "HeroGuy" user profile, instructs the system to place Presence/Location information for Jack Doe in P/L Server 108 as part of Jack Doe's overall presence/location information in the virtual world.

When another real world network user, e.g., "Mary" desires to contact Jack, for example, via a multimedia SIP connection from her NAD 102, Mary initiates a multimedia 'call' using Jacks global address (e.g., 677-456-7890). Network 104 receives Mary's call request, which is handled by AS 106 that queries P/L server 108 to check Jack's "whereabouts." The P/L server 108 then determines that Jack can be reached at HeroGuy@VW1.com. In this connection, Jack's user profile/screening criteria (as, say, stored in the AS 106) permits Mary (Mary@att.com) to reach him at HeroGuy@VW1.com. Network 104 establishes a multimedia call to the called endpoint (VW1 resources/GWa) 112. Through VW1 GWa 112, VW software 116 detects an incoming call, specifically for HeroGuy@VW1.com and recognizes that it is a request for a multimedia call, so the ERS 120 can then execute to render an appropriate video+audio image to VW1 GWa 112. HeroGuy's VW1 user profile may influence the video+audio image that is presented to Mary—e.g., it may be the sights and sounds of what HeroGuy is experiencing in VW1, or it might be a completely different audio/visual presentation that is only to be specifically provided to external callers. Likewise, ERS 120 can be configured to provide a multimedia presentation of Mary to HeroGuy in any desired and user-customized fashion.

It will appreciated by those skilled in the art that the users can communicate via different media in a conventional manner. In accordance with aspects of the disclosure, real world and virtual world users can intercommunicate over the communications network and into/out of virtual worlds, where real or virtual users are identified by addressing information and where addresses could be of the same sort for both real and virtual users—e.g., E.164 numbers, or sip addresses or http addresses, etc.

In accordance with an aspect of the disclosure, locations in virtual and real worlds may be merged within the system. For example, "Jack" may actually be located in New York City, as determined by, for example, his computer's IP address, or by data from the satellite Global Positioning System (GPS) associated with his network access device, or a separate device, or by mobile telephone locating technologies, or the like. Similarly, HeroGuy@VW1.com may actually be located in Chamber 3 of Level 9 of VW1. Thus, these users are enabled to view each other's respective location in the real and virtual worlds.

In alternative embodiments, virtual-virtual, virtual-real and real-real world communication scenarios are possible. For example, "WonderWoman" (Mary's virtual persona, not shown in FIG. 1), may wish to communicate with "HeroGuy" in a virtual-virtual world session. Similarly, "HeroGuy" may wish to communicate with "Mary" in a virtual-real world session, or "Jack" may wish to communicate with "Mary" in a conventional real-real session. Communications may be comprised of an exchange of voice, text, video, or other multimedia, and may include presence and/or location information, as permitted by user-specified profile permissions.

In another embodiment, P/L server 108 can be disposed within a specific network operator's domain, or it could be some federated system.

In yet another embodiment, a plurality of service networks may be employed as will be appreciated by those skilled in telecommunications. It is unnecessary for "Mary" and "Jack" to be customers of the same network.

In yet another embodiment, the address for the VW persona can be a POTS address served by VW1, instead of a SIP URL.

In yet another embodiment, contact permissions may be included with the Presence/Location function.

In yet another alternative embodiment, a virtual world persona can also 'call out' to a real person or to another persona in a different virtual world. A virtual persona could also have its presence/location information distinct from the real world user. For example, P/L Server 108 could list HeroGuy@VW1.com as a separate entry apart from JackDoe@att.com.

In addition, communications may encompass typical real world implementations, such as including but not limited to voice, video, MMS, short message service (SMS) texting, twittering, email, etc. Real and virtual world users may be conferenced together by existing conferencing capabilities in circuit or packet switched networks.

The following are definitions, descriptions, and clarifications (not limitations) of the present disclosure:

Virtual worlds—software-based alternative worlds (e.g. Second Life, Disney Toontown or the like), multi-player internet games, chat rooms, simulation environments, etc.—anything where a participant may have a virtual identity for which presence/location and/or communication is relevant.

Options for user-user communication—voice or video sessions, texting, email, RSS feeds, content sharing (still pictures, files, and so on), video-share, etc., as relevant for the capabilities of any particular virtual world as well as the real world. Communication may be point-to-point two-party, or conference multi-party, or broadcast multi-party or other configurations.

Opportunities for communication mode of presentation in a virtual world could be selected by the participant according to options supported within any given virtual world—; e.g. for voice call, it could simply come over audio, or could ring a phone in the virtual world; or a text message could be presented as text banner on the screen, or show up on a mobility device in the virtual world, or appear as (e.g.) skywriting or on a billboard; or video could show up on a TV screen in the virtual world or in a crystal ball there.

Sharing of information and opportunities to communicate may be made subject to user permissions and in accordance with network security protocols and policies as desired.

If a participant is to 'join' a virtual persona at its location in a virtual world—as another virtual persona, there may be an expedited way for that connection to take place, which can be made automated by virtue of the networked user simply joining the virtual world, thereby obviating the need to manually supply location coordinates.

Inter-virtual and real-virtual world communications do not necessarily require that the originating party belong as a member to the virtual world of the target virtual persona. Moreover, the communications aspect may include other known forums such as blogging, twitter, RSS feeds, and the like.

A presence/location server does not necessarily have to be a single monolithic piece of equipment. It may be distributed in nature. As one alternative, a given VW may keep its own presence/location information for its own virtual world personae, which may be queried by other presence/location servers, based on the address/identity of the entity whose presence/location information is being sought.

In another implementation, the presentation of the virtual persona can pair information to that of the real-world user associated therewith. In this manner, a user can request real world location information of the user who is manipulating the virtual persona in the virtual world. For example, a participant may be playing a character in a virtual world located in Florida, but he or she is actually located in Montana. A request through the system for the real-world location can generate a display of the same in the virtual world by pairing this information to that associated with the virtual persona.

Figure 2:
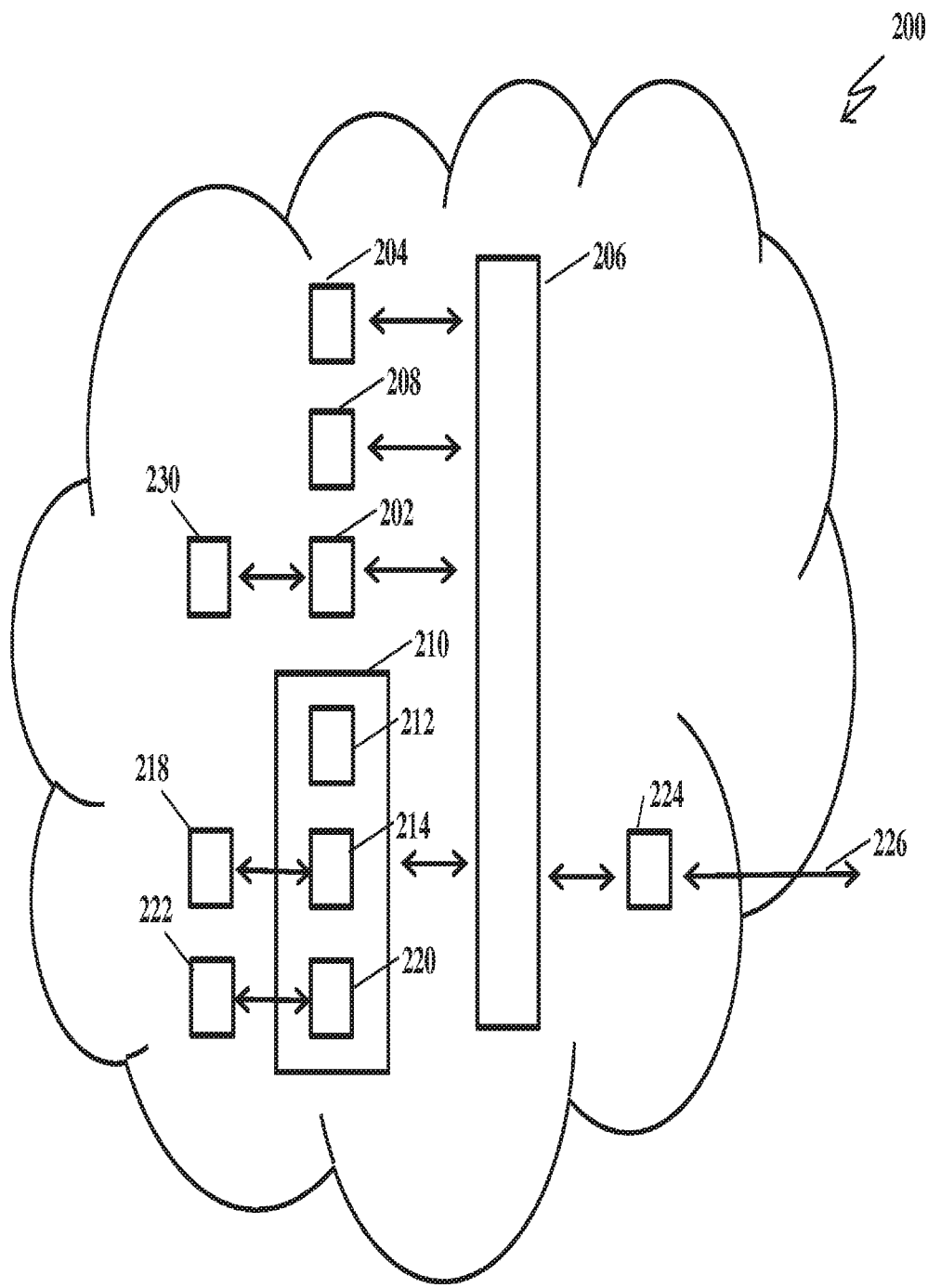
FIG. 2 is a schematic of an exemplary computer system for implementing the functionality of the present disclosure.

The present disclosure may be implemented using hardware, firmware, software or any combination thereof, and may be implemented in one or more computer systems and/or other processing systems. FIG. 2 is a schematic of an exemplary computer environment characterized by the reference numeral 200 that can be used as a network access device or a server to implement the functionality of the present disclosure. It will be appreciated by those skilled in the art that computer system 200 may operate as a server that is networked to other computers (network access devices) to operate as a client/server system, as known by those skilled in the art, or computer 200 may operate as a standalone system. Computer system 200 includes one or more processors, such as processor 204. Processor 204 is connected to a communication infrastructure 206 (e.g., a communications bus, cross-over bar, or network). Computer system 200 can include a display interface 202 (e.g. a graphics card) that allows graphics, text, and other data from the communication infrastructure 206 (or from a frame buffer not shown) to be displayed on a display unit 230. Computer system 200 also includes a main memory 208, preferably random access memory (RAM), and may also include a secondary memory 210. The secondary memory 210 may include, for example, a hard disk drive 212 and/or a removable storage drive 214. The removable storage drive 214 has read/write functionality onto removable storage media 218 having stored therein computer software and/or data. In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200. Computer system 200 may also include a communications interface 224 allowing software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals (not shown), which may be electronic, electromagnetic, optical or other signals capable of being received by communications interface 224. These signals are provided to communications interface 224 via a communications path (e.g., channel) 226. This path 226 carries the signals and may be implemented using wire or cable, fiber optics, a telephone line, a cellular link, a radio frequency (RF) link and/or other communications channels. Computer programs (also referred to as computer control logic) are stored in main memory 208 and/or secondary memory 210. Computer programs may also be received via communications interface 224. Computer programs, when executed, enable the computer system 200 to perform the features of the present disclosure, as discussed herein. Accordingly, such computer programs represent controllers of the computer system 200. In an embodiment where the disclosure is implemented using software, the software may be stored in a computer program product and loaded into computer system 200 using removable storage drive 214, hard drive 212, or communications interface 224. The control logic (software), when executed by the processor 204, causes the processor 204 to perform the functions of the disclosure as described herein. In another embodiment, the disclosure is implemented primarily in hardware using, for example, hardware components, such as application specific integrated circuits (ASICs). Implementation of the hardware state machine so as to perform the functions described herein will be apparent to persons skilled in the relevant art(s). In one exemplary embodiment, the system for the present disclosure may be implemented, for example, as a Microsoft.net™ desktop application program (Microsoft-.net™ is made by Microsoft™ Corporation of Redmond, Wash.), which may reside on a computer hard drive, database or other repository of data, or be uploaded from the Internet or other network (e.g., from a PC, minicomputer, mainframe computer, microcomputer, telephone device, PDA, or other network access device having a processor and input and/or output capability). Any available software tool capable of implementing the concepts described herein may be used to implement the system and method of the present disclosure. The method and system of the present disclosure may also be implemented as an application-specific add-on to a program, or as a standalone application.

The above-described methods may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, minicomputers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any machine encoded medium that provides or participates in providing instructions to the processor. Such a medium includes but is not limited to non-volatile media, volatile media and transmission media. For example, non-volatile media can include optical or magnetic memory disks. Volatile media include dynamic random access memory (DRAM), which typically constitutes the main memory. Common expedients of computer-readable media are well-known in the art and need not be described in detail here.

The foregoing detailed description is to be understood as being in every respect illustrative and exemplary, but not restrictive, and the scope of the disclosure disclosed herein is not to be determined from the description of the disclosure, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure.

What is claimed is:

1. A method comprising:
   determining, by a processing system including a processor, first virtual location data associated with a first user of a first communication device, wherein the first virtual location data represents a first position of a first avatar in a virtual world generated by a computing device;
   adjusting, by the processing system, a multimedia session between the first communication device and a second communication device of a second user to simulate one of sounds, graphics or a combination thereof associated with the first avatar in the virtual world for presentation at the second communication device;
   determining, by the processing system, first location data associated with a first location of the first communication device; and
   publishing, by the processing system, the first location and the first position to the virtual world;
   wherein the publishing the first location and the first position to the virtual world comprises enabling equipment of one or more other users having one or more respective other avatars in the virtual world to be presented with first published information representative of the first location and the first position at the equipment; and
   wherein the first published information representative of the first location and the first position is presented using text appearing in the virtual world.

2. The method of claim 1, further comprising determining, by the processing system, second virtual location data associated with the second user of the second communication device, wherein the second virtual location data represents a second position of a second avatar in the virtual world, and wherein the first avatar represents the first user and the second avatar represents the second user.

3. The method of claim 2, further comprising:
   determining, by the processing system, second location data associated with a second location of the second communication device;
   wherein the publishing further comprises publishing of the second location and the second position to the virtual world; and
   wherein the publishing further comprises enabling the equipment of the one or more other users having the one or more respective other avatars in the virtual world to be presented with second published information representative of the second location and the second position at the equipment.

4. The method of claim 3, wherein each of the first location data and the second location data comprises respective global positioning system data.

5. The method of claim 3, wherein the first user is provided with the second location of the second communication device and the second position of the second avatar via the first avatar, and wherein the second user is provided with the first location of the first communication device and the first position of the first avatar via the second avatar.

6. The method of claim 3, wherein the determining the second location data comprises receiving, by the processing system, the second location data.

7. The method of claim 2, wherein the determining the second virtual location data comprises receiving, by the processing system, the second virtual location data.

8. The method of claim 1, further comprising:
providing, by the processing system, voice communication between the first communication device and the second communication device; and
graphically representing, by the processing system, the voice communication between the first communication device and the second communication device in the virtual world.

9. The method of claim 1, wherein the computing device is part of the processing system.

10. The method of claim 1, wherein the determining the first virtual location data comprises receiving, by the processing system, the first virtual location data.

11. The method of claim 1, wherein the determining the first location data comprises receiving, by the processing system, the first location data.

12. The method of claim 1, wherein the processor comprises a plurality of processors operating in a distributed processing environment.

13. A server comprising:
a processing system including a processor; and
a memory that stores executable instructions that, when executed by the processing system, perform operations, the operations comprising:
determining a first position of a first avatar in a virtual world, wherein the virtual world is generated by a computing device;
adjusting a multimedia session between a first communication device of a first user and a second communication device of a second user to simulate one of sounds, graphics, or a combination thereof experienced by the first avatar in the virtual world for presentation at the second communication device;
receiving first location data associated with a first location of the first communication device;
providing the second user of the second communication device with the first location of the first communication device and the first position of the first avatar; and
publishing the first location and the first position to the virtual world;
wherein the publishing the first location and the first position to the virtual world comprises enabling equipment of one or more other users having one or more respective other avatars in the virtual world to be presented with published information representative of the first location and the first position at the equipment; and
wherein the published information representative of the first location and the first position is presented using text appearing in the virtual world.

14. The server of claim 13, wherein the operations further comprise:
receiving second location data associated with a second location of the second communication device; and
providing the first user of the first communication device with the second location of the second communication device and a second position of a second avatar via the first avatar.

15. The server of claim 14, wherein each of the first location data and the second location data comprises respective global positioning system data and wherein the processor comprises a plurality of processors operating in a distributed processing environment.

16. The server of claim 13, wherein the operations further comprise determining a second position of a second avatar in the virtual world, wherein the first avatar represents the first user of the first communication device, and wherein the second avatar represents the second user of the second communication device.

17. The server of claim 13, wherein the computing device is part of the server.

18. A non-transitory machine-readable storage medium comprising executable instructions that, when executed by a processing system including a processor, perform operations, the operations comprising:
presenting, in a virtual world to an avatar, voice communication data from a first communication device associated with a first user, wherein the avatar is generated in the virtual world for presentation at a second communication device associated with a second user, wherein the virtual world is generated by a computing device, and wherein the voice communication data is presented via one of text, an audible message or a combination thereof;
obtaining virtual communication data from the second user utilizing the second communication device, wherein the virtual communication data is obtained via interaction between the second user and the avatar;
providing the virtual communication data to the first communication device;
adjusting a multimedia session between the first communication device and the second communication device to simulate one of sounds, graphics or a combination thereof experienced by the avatar in the virtual world for presentation at the first communication device;
presenting at the second communication device a first location of the first communication device via the avatar;
publishing to the virtual world a second location of the second communication device and a position of the avatar;
wherein the publishing the second location and the position to the virtual world comprises enabling equipment of one or more other users having one or more respective other avatars in the virtual world to be presented with published information representative of the second location and the position at the equipment; and
wherein the published information representative of the second location and the position is presented using text appearing in the virtual world.

19. The non-transitory machine-readable storage medium of claim 18, wherein the processor comprises a plurality of processors operating in a distributed processing environment.

20. The non-transitory machine-readable storage medium of claim 18, wherein the processing system comprises the computing device.

* * * * *